Aug. 13, 1935.    R. A. MILLER    2,011,498
METHOD OF REPAIRING AND TREATING GLASS POTS AND THE LIKE
Filed June 30, 1933    3 Sheets-Sheet 1

INVENTOR
Robert A. Miller
BY Bradley, Bee
ATTORNEYS

Aug. 13, 1935.  R. A. MILLER  2,011,498
METHOD OF REPAIRING AND TREATING GLASS POTS AND THE LIKE
Filed June 30, 1933  3 Sheets-Sheet 2
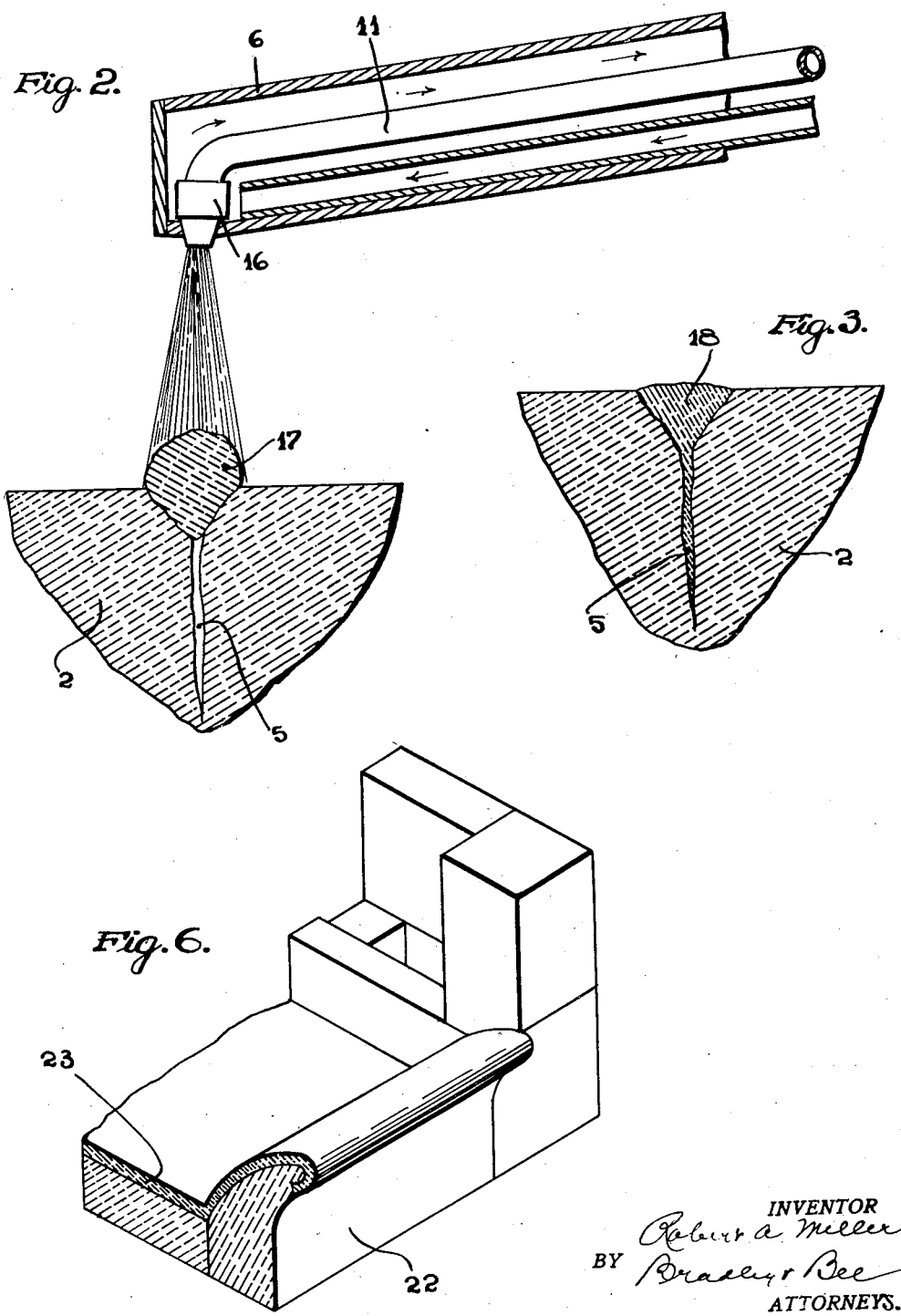

Aug. 13, 1935.    R. A. MILLER    2,011,498
METHOD OF REPAIRING AND TREATING GLASS POTS AND THE LIKE
Filed June 30, 1933    3 Sheets-Sheet 3

INVENTOR
Robert A. Miller
BY
ATTORNEYS.

Patented Aug. 13, 1935

2,011,498

UNITED STATES PATENT OFFICE 2,011,498

METHOD OF REPAIRING AND TREATING GLASS POTS AND THE LIKE

Robert A. Miller, Tarentum, Pa., assignor to Pittsburgh Plate Glass Company, a corporation of Pennsylvania Application June 30, 1933, Serial No. 678,432

8 Claims. (Cl. 25—156)

The invention relates primarily to a method of repairing glass pots of refractory material, such as clay and the like. The method is also applicable to the welding together of clay blocks and to the treatment of pots or other articles of clay coming in contact with molten glass in such manner as to make their surfaces more resistant to solution in the glass. The pots to be repaired or treated may be of the type known as a forehearth used in continuous production of sheet or plate glass, or of the round or oval type used in the intermittent production of plate glass or optical glass, wherein the pots are placed in a pot furnace and the batch supplied thereto is fused, being subsequently removed after the glass is "finished". In some cases, the repair is applied to one of the sectional parts of a pot or forehearth.

Figure 1:
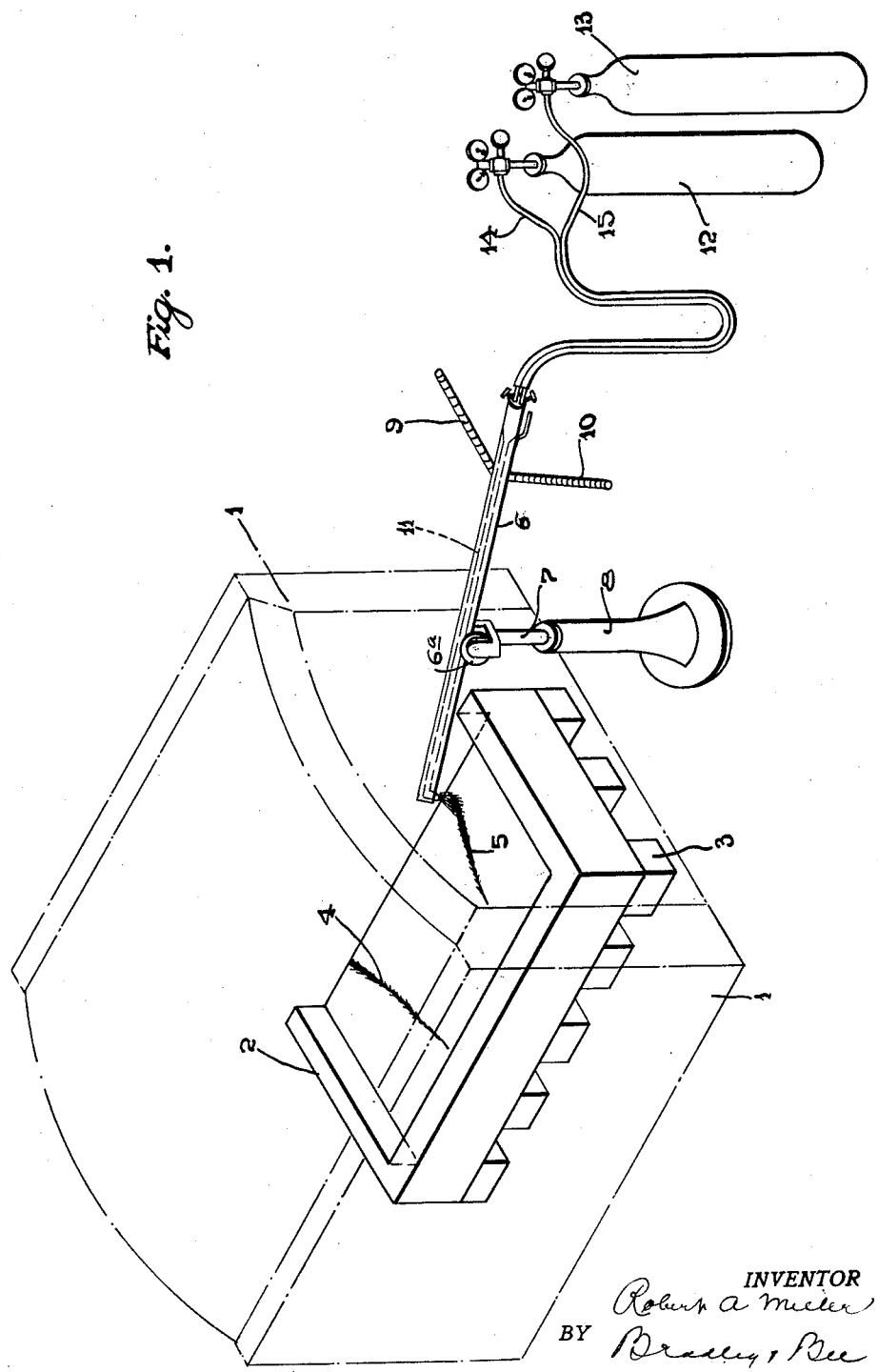
Figure 4:
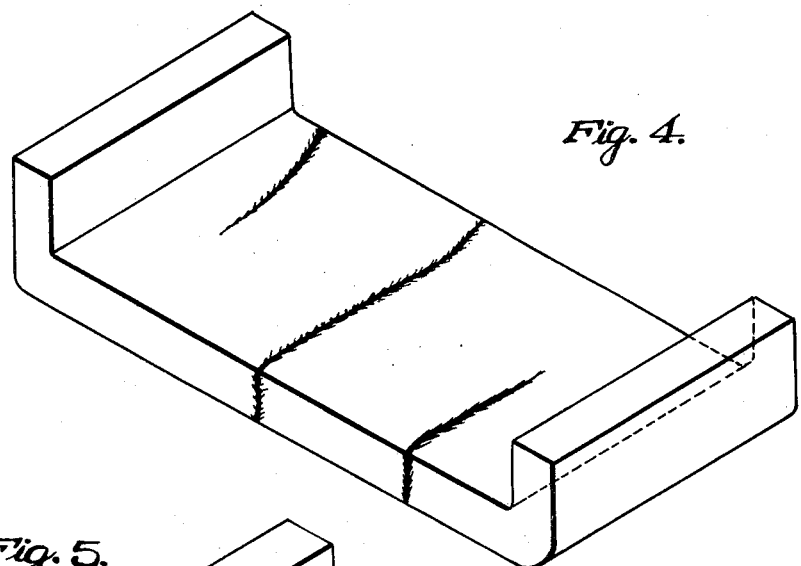
Figure 5:
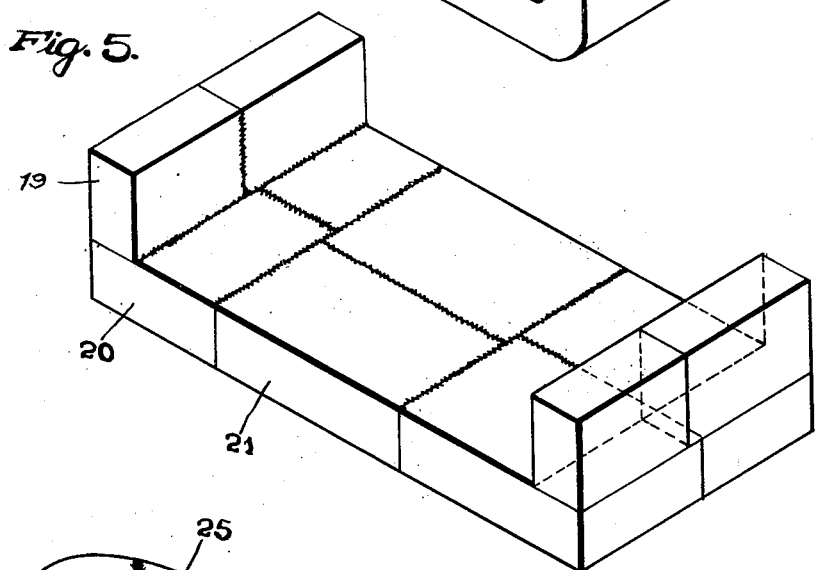
Figure 7:
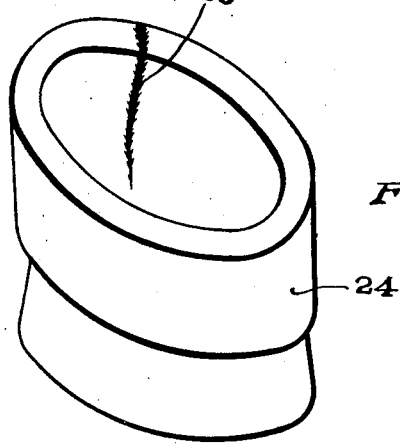

In the process of "bringing up" pots or containers or parts thereof in the arch furnace, they frequently crack, or they may crack after such heat treatment while being placed in position for use. It has been the practice to discard such pots as useless, thereby involving a considerable loss of time, money and material, and in order to guard against the further loss of time in actual glass production resulting from the breakage of a pot in the arch, or in setting, it has been the common practice to bring up two pots side by side, so as to reduce the ultimate hazard of losing glass production time. I have found that these and similar clay articles may be reclaimed or mended at a small expense so that they will give a service comparable to that of an article which has not been cracked or broken. The means for accomplishing this result are illustrated in the accompanying drawings, wherein:

Figure 1 is a perspective view illustrating the use of the invention in repairing a drawing extension or forehearth. Fig. 2 is an enlarged detail section showing the starting point in the operation. Fig. 3 is an enlarged detail section showing the finished weld. Fig. 4 is a perspective view illustrating a roll pot section to which the repair has been applied. Fig. 5 is a perspective view illustrating a roll pot section built up of separate blocks welded together by the improved method. Fig. 6 is a perspective view showing a roll pot lip whose surface has been treated by the method in order to make such surface more resistant to the action of the glass flow thereover. And Fig. 7 is a perspective view of the glass pot to which the repair has been applied.

Referring to Fig. 1, the dotted lines 1 indicate an arching furnace in which the article to be repaired is placed preliminary to the welding operation. The article to be repaired in this case is a draw pot or forehearth 2, such as is used at the outlet end of a drawing tank in the manufacture of window glass. This pot is seated upon suitable supports or stools 3 and the lines 4, 5 indicate cracks which require repair. In making the repair, the entire pot is maintained at a temperature of from 1800 to 2400 deg. F. and an oxyacetylene torch is employed in making the weld, such torch including a casing 6 supported on a roll 6a carried by the bar 7. This bar is in turn swivelled in the stand 8. The casing is water cooled by means of the flexible connections 9, 10, which give a flow of water through the casing, as indicated by the arrows in Fig. 2. The blow pipe 11 extends through the casing and is supplied with oxygen and acetylene from the containers 12 and 13 through the flexible pipes 14 and 15. The pipe 11 discharges the mixture of oxygen and acetylene through the nozzles or tip 16.

In repairing the crack or joint, the flame from the tip 16 is caused to play along the crack until the clay is fused and runs into the crack. In some instances in order to provide additional clay to fill the crack, chunks or pieces of clay 17 are laid along the crack before beginning the fusing operation, as indicated in Fig. 2. This material and the material along the edges of the crack melts down and fills it, as indicated at 18 in Fig. 3. In using the torch, it is desirable to use an excess pressure and volume of oxygen as compared to the normal welding mixture used with other materials. This excess of oxygen is essential in order to prevent the carbonization of the clay body, to assist in the oxidation of the clay material, and to obtain maximum temperatures. When the clay body is repaired in this manner, the fused and unfused portions of the clay body are closely interknit, and since there is no sharp line of demarcation between the fused and unfused portions of the clay as a result of this joinder, there is no tendency for the unfused clay body to pull away and crack from the fused portion. Further, the temperatures at which fusion is made are above the highest normal inversion temperature of the solid materials, the coefficients of expansion of the fused and unfused mass are so close together as to prevent the separation and disintegration of the bond when such materials are lowered in temperature, even through a very large temperature range. After the weld is completed, the article is allowed to cool down slowly in the usual way.

Fig. 4 illustrates a section of a roll pot body such as is used in the continuous manufacture of plate glass which has been mended or repaired in three places in accordance with the process heretofore described.

The process may also be employed in order to weld together sections of clay articles instead of making such articles in one piece. In this case, a roll pot similar to that of Fig. 4 is built up of the clay blocks 19, 20, 21, etc., which are fused together at their edges by employing the process as heretofore described, the blocks being assembled, as shown, upon proper supports in an arching furnace, and then raised to arching temperature preliminary to applying the welding process thereto.

Fig. 6 illustrates the application of the process in still another way. The article treated in this case is the roll lip 22, such as is employed in the manufacture of plate glass in a continuous process in which a pair of sizing rolls are placed in opposition to the lip. The purpose of the process in this case is to produce a glaze upon the upper surface of the lip, which comes in contact with the glass so as to make the lip more resistant to corrosion or the washing action of the glass. This glazed layer is indicated by the reference numeral 23 and is applied by causing the flame from the acetylene torch to play over the surface until such surface is fused to the flowing point. The glaze as thus formed is much more resistant to the action of the molten glass so that the life of the lip as thus treated is substantially increased. The same process may be applied to the surface of any article which contacts with molten glass, such for instance as the interior of a glass melting pot or the face of a tank block which contacts with the molten glass in the tank. It will be understood that in so treating the article it is first raised to a relatively high temperature in an arching furnace as heretofore described in connection with Fig. 1.

After the process of welding or glazing is completed, the article may be allowed to cool slowly in the usual way, or, if desired, it may be put into service at any temperature at which it can be conveniently handled.

Fig. 7 shows a glass pot 24 which has been cracked along one edge, as indicated at 25 and which has been repaired in the manner heretofore described by causing the torch to play along the crack and fuse the clay while the pot is maintained at a temperature of from 1800 to 2400 deg. F.

The term "clay" as used herein is intended in its broad sense to cover the usual silica alumina compound used in glass refractories, as well as special mixes, such as "mullite" and the like, as the method is applicable regardless of the specific mixture, the only modifications in the process being in the matter of temperatures applied to secure the repair or weld, the more refractory mixes requiring the application of higher temperatures by the torch in order to cause the material to fuse and flow to produce the weld.

The torch used is preferably an oxy-acetylene one, but other high temperature oxygen torches capable of giving the necessary fusing temperatures may be used and it will be understood that the term "high temperature oxygen gas torch" as used in the claims is intended to comprehend such equivalent torches.

What I claim is:

1. A method of treating a clay article which consists in maintaining it at arching temperature and applying to the surface thereof the flame of a high temperature oxygen gas torch causing such surface to fuse and flow.

2. A method of treating a clay article which consists in maintaining it at a temperature of from 1500 to 1800 deg. F., and applying to the surface thereof the flame of a high temperature oxygen gas torch causing such surface to fuse and flow.

3. A method of securing a weld between the opposing edges of clay parts which consists in maintaining the parts at arching temperature and subjecting the joint between the parts to the flame of a torch at such temperature that the edges of the clay fuses and flows, and then permitting the joint to harden.

4. A method of securing a weld between the opposing edges of clay parts which consists in maintaining the parts at arching temperature and subjecting the joint between the parts to the flame of a high temperature oxygen gas torch causing the clay at the joint to fuse and flow, and then permitting the joint to harden.

5. A method of securing a weld between the opposing edges of clay parts which consists in maintaining the parts at a temperature of from 1300 to 2400 deg. F., subjecting the joint to the flame of a high temperature oxygen gas torch causing the clay at the joint to fuse and flow, and then permitting the joint to harden.

6. A method of securing a weld between the opposing edges of the clay parts which consists in maintaining the parts at a temperature of from 1800 to 2400 deg. F., subjecting the joint to the flame of a high temperature oxygen gas torch to which an excess volume of oxygen is supplied so as to cause the clay at the joint to fuse and flow, and then permitting the joint to harden.

7. A process of forming a plurality of clay blocks into a unitary body which consists in assembling the blocks with their edges in contact, raising the temperature of the blocks to arching temperature, applying the flame of a high temperature oxygen gas torch along the joints between the blocks causing the clay to fuse and weld along such joints, and then permitting the joints thus formed to harden.

8. A process of mending a clay container which is cracked, which consists in maintaining the container at arching temperature, applying the flame of a high temperature oxygen gas torch along the crack causing the clay along such crack to fuse and flow thus filling the crack, and then permitting the fused clay to harden.

ROBERT A. MILLER.